Figure 1:
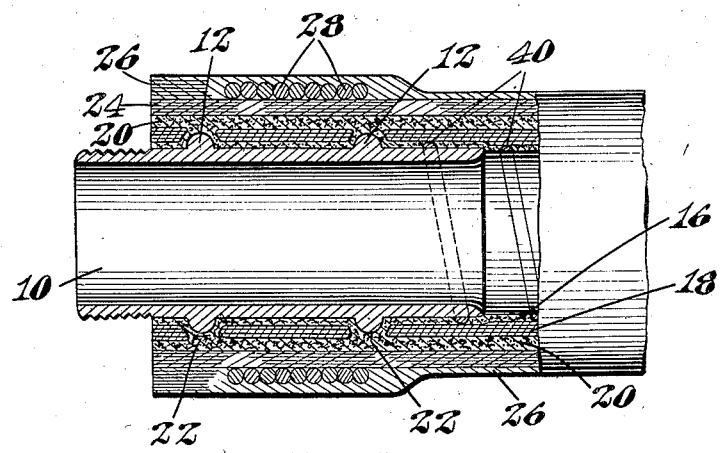

Aug. 14, 1934.      T. M. KNOWLAND      1,970,513
HOSE NIPPLE CONNECTION
Filed Aug. 2, 1933

INVENTOR
Thomas M. Knowland.
by Kenway & Witter.
Attys.

UNITED STATES PATENT OFFICE 1,970,513

HOSE NIPPLE CONNECTION

Thomas M. Knowland, Watertown, Mass., assignor to Boston Woven Hose and Rubber Company, Cambridge, Mass., a corporation of Massachusetts Application August 2, 1933, Serial No. 683,269

7 Claims. (Cl. 285—80)

This invention relates to hose and nipple connections therefor embodying rubber or rubberized material in its construction and has an important field of use in relation to oil loading hose. For purposes of illustration the invention will be described in that relation, particularly since the same involves very exacting requirements in use and some of the advantages incident to my invention are therefore emphasized in that field.

Oil loading hose is largely used for transferring fuel oil, gasoline and the like from storage to tank steamers or vice-versa. A serious fire risk results from any leakage of hose used for such purpose and it is moreover desirable that no outside band of metal be used on the hose ends because of the fire hazard and for liability of damage to either ship decks or docks. Hose of this character is moreover subjected to rough usage and years of service are required of it.

It has been customary to manufacture oil loading hose with a structure consisting of rubberized fabric and a tube of rubber designed to prevent oil penetration into the hose body. Frequently a spiral of wire is embedded in the hose body to improve its strength and kinking resistance. The hose body is built up of unvulcanized materials which are suitably applied or wound upon a mandrel or pole after which the hose is vulcanized and then removed from the mandrel in accordance with methods of commercial manufacture well understood. The present invention deals with the difficult problem of building into the flexible hose structure, in a mechanically secure and leak-proof manner, a pipe nipple by which connection may be made between different hose sections and between the hose ends and the inlet and outlet nozzles with which it is to be connected in use. Serious difficulty has been encountered in the past in that, however tightly the hose body may be originally bound upon the nipple, there has been an unavoidable flowing or longitudinal displacement of the material during the vulcanizing operation due partly to the softening of the rubber constituents of the hose body and the consequent flow under compression. In cases where attempts have been made to secure a tight bond by compressing a section of the hose body between an outer binding ring and a nipple, the bonding pressure of the hose body upon the nipple has been found to be so reduced, in the vulcanizing operation, as to permit seepage of oil around the inner end of the nipple and along the wall thereof to the end of the hose. In order to prevent these objectionable tendencies, the present invention contemplates, as a characteristic step, the expanding of the wall of the nipple inside the hose body after the vulcanizing operation has been completed and consequently when the interposed material of the hose body has reached a permanent or stable condition. I have discovered that such expansion of the wall of the nipple results in a compression of the vulcanized material of the hose body which not only produces a mechanically tight union but is effective in preventing seepage of oil into the hose body and along the nipple. The strong and leak-proof connection thus produced is durable, reliable and capable of being produced at reasonable cost by convenient steps of manufacture.

In some cases it is desirable definitely to limit the zone or section of the nipple to be expanded and my invention contemplates as an additional and optional feature circumferential reinforcing ribs which are effective to define the zone to be expanded in the nipple and which also contribute to the formation of a firm and secure bond between the nipple and the hose body. It will be understood that a similar result might be secured by reducing the thickness of the wall of the nipple in the zone to be expanded and that these expedients are of secondary importance only although they may be advantageous in some cases, as for example in hose of larger diameter.

Another important feature of my invention consists in a circumferential dam of rubber formed in the body of the hose concentric with the nipple and in such position as to stop off or traverse certain inner layers of the rubberized fabric wound into the hose body. I have discovered that one or more dams of this character are highly effective in preventing seepage of oil or other liquid longitudinally in the fabric of the hose body. As herein shown, I prefer to employ a pair of spaced dams making material contact with the nipple or with the ribs formed upon the nipple since a rubber to metal or rubber to fabric union is more permanent and leak-proof than a fabric to metal union. Also, if preferred, I may combine the circumferential dams in a connection which includes also an expanded wall nipple. These two features are cooperative and may be thus advantageously associated.

Figure 2:
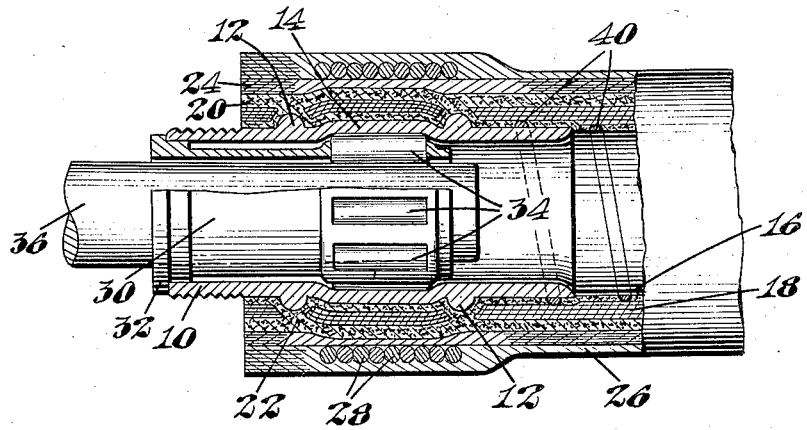

These and other features of the invention will be best understood and appreciated from the following description of a preferred embodiment thereof selected for purposes of illustration and shown in the accompanying drawing in which:

Fig. 1 is a view in longitudinal section of my improved hose nipple connection prior to the step of expanding the wall of the nipple, and Fig. 2 is a similar view showing the wall of the nipple expanded and an expanding tool inserted therein.

In Fig. 1 it may be assumed that the hose with its nipple connection has been vulcanized and withdrawn from the mandrel upon which it is manufactured and vulcanized. The steel nipple 10 is threaded at its outer end and provided with a pair of annular reinforcing ribs 12. These may be of any desired shape and may be welded to or otherwise secured upon the nipple. The inner layer of the hose comprises a helix of heavy half round wire over which is formed a rubber tube 16. This, as will be understood, is first wrapped about the mandrel and the tube 16 envelopes the nipple 10 and the ribs 12 to a point adjacent to its outer threaded end. The rubber tube 16 of course fits snugly upon the nipple, conforming in contour to the ribs thereon and the wire 40.

Upon the rubber tube 16 is next wound several layers or plies 18 of textile rubberized fabric or duck. This material is cut on a bias from the web and wound tightly into the hose body as a continuous ribbon. As shown in Fig. 1 it may comprise three or four plies and it is wound in such a manner as to leave circumferential openings substantially opposite to the ribs 12 of the nipple. The next layer of the hose body comprises a second rubber tube 20 which is wound tightly upon the surface of the fabric layer 18 and which fills the circumferential openings left therein and makes continuous contact with the inside rubber tube 16. In effect, the inner and outer rubber tubes are united in a pair of circumferential dams or stops 22 which extend outwardly past or beyond the ends of the fabric plies 18. As will be apparent from an inspection of the drawing, any liquid which may reach the plies 18 and seep longitudinally and outwardly therein will be arrested by the dams 22 and seepage outwardly beyond the rubber layer 20 is effectively prevented by the thickness and character of this layer.

The hose body next includes another layer 24 of rubberized textile fabric wound tightly upon the rubber layer 20. Outside the fabric layer 24 and substantially concentric with the zone between the ribs 12 of the nipple is provided an outer binding layer of steel wire 28. This is wound tightly upon the body of the hose which has progressed in its construction to this point and its ends are secured by welding or otherwise so that the coil forms in effect a rigid, unexpansible, metallic binding ring. In order to protect this binding ring and cover the metal thereof, an outer layer 26 of rubberized fabric is then wound upon the body of the hose completing the same and furnishing its exterior surface. Having progressed to this stage, the hose body is vulcanized by being subjected to heat while in position upon a mandrel, not shown. It is then removed from the mandrel with the nipple 10 built into its structure as above explained and the wall of the latter may now be expanded in substantially the zone defined by the spacing of the ribs or bands 12. This operation may be effected in any desired manner but as herein shown an expanding tool 30 is employed and this has a recessed head provided with rollers 34 designed to be inserted within the nipple. The head is properly located by a flange or ring 32 at the outer end of the tool. The tool is rotated and at the same time the rollers 34 are forced outwardly by a tapering expanding element 36 which is advanced longitudinally into the expanding tool. As the latter is rotated the walls of the nipple are expanded forming an enlargement 14 in the passage of the nipple and compressing the material of the hose body interposed between it and the binding wire 28. As has already been stated, and is again to be emphasized, this material, previous to this expanding operation, has been vulcanized and so converted into a stable condition not subject to further contraction. Consequently, the expanding action of the enlargement 14 of the nipple exerts a powerful and permanent compression upon this material. As shown in Fig. 2 the compressed material is included between and to some extent includes the circumferential dams 22 formed in the rubber material of the hose body.

While the coil of wire 28 forms in effect a single integral binder, it will be understood that separate rings or binders may be employed if desired and that the expanded section of the nipple may be correspondingly shaped. It will be clear from the foregoing description that the method of my invention is particularly useful in its application to oil hose where the metallic binding element must be permanently enclosed in the hose body as the latter is built up, thus precluding the possibility of contracting the binding element after the hose has been vulcanized.

Having thus described my invention, what I claim as new and desire to secure by Letters Patent of the United States is:

1. The method of making hose nipple connections which consists in enveloping a pipe nipple with layers of unvulcanized sheet rubber material, encircling a zone of said material by a metallic binder, vulcanizing the enveloping material, and then expanding a section of the body of the nipple within said binder directly against the vulcanized material of the hose.

2. The method of making hose connections which consists in winding rubberized fabric and unvulcanized sheet rubber upon a pipe nipple in such a manner as to form a circumferentially complete dam of rubber extending outwardly from the nipple beyond certain plies of the rubberized fabric, then vulcanizing the assembled material, and finally compressing it after vulcanization in a location adjacent to said dam.

3. The method of making hose connections which consists in winding sheet rubber to form an initial layer about a pipe nipple having a circumferential flange therein, winding plies of unvulcanized rubberized fabric thereon in such manner as to leave a circumferential opening extending inwardly to the initial rubber layer opposite to the nipple flange, winding more sheet rubber upon the fabric layers in such manner as to fill said opening and form a circumferentially complete rubber dam, and then vulcanizing the material thus assembled.

4. The method of forming hose connections which consists in reinforcing a pipe nipple by spaced circumferential bands, enveloping the nipple and bands in an unvulcanized rubber tube, winding fabric thereon having the rubber exposed circumferentially above the bands, forming a second rubber tube outside said fabric and contacting with the first above the bands, binding the assembled material in a zone symmetrical with respect to the ribs, vulcanizing it, and finally expanding the wall of the nipple inside the material thus bound.

5. A nipple connection for hose, comprising a vulcanized hose body, a metallic binding member enclosed within the body of the hose, an inner pipe nipple concentric therewith and having an integral section of its wall deflected outwardly with the hose body vulcanized thereto in an area substantially opposite to said binding member, thereby outwardly deflecting the inner wall of the hose body and holding the vulcanized material thereof firmly compressed against the binding member, the said binding member and nipple being independent units in the assembled connection.

6. A high compression nipple connection for hose, comprising a vulcanized section of hose body including a circumferentially complete dam embedded in rubberized textile material, an enclosed metallic binder, and an inner pipe nipple concentric therewith and having its wall expanded toward the binder to compress the vulcanized material adjacent to the dam.

7. A high compression nipple connection for hose, comprising a pipe nipple having spaced ribs therein, a vulcanized section of hose including circumferentially complete rubber dams making rubber-to-metal contact with the ribs of the nipple and traversing plies of textile fabric in the hose body, and an enclosed metallic binder, the walls of the nipple being expanded between said ribs, thereby holding under compression the vulcanized material of the hose body which is interposed between the nipple and the metallic binder.

THOMAS M. KNOWLAND.